United States Patent [19]

Moncrief

[11] 3,837,659
[45] Sept. 24, 1974

[54] SEALS FOR ROTARY SHAFTS
[76] Inventor: E. Ray Moncrief, 1132 Plum, La Marque, Tex. 77568
[22] Filed: Dec. 4, 1972
[21] Appl. No.: 311,858

[52] U.S. Cl. ............... 277/74, 184/1 E, 277/93 SD
[51] Int. Cl. ... F16n 17/04, F16n 15/00, F16j 15/34
[58] Field of Search ............... 277/1, 15, 16, 71, 74, 277/75, 93 SC; 184/1 E

[56] References Cited
UNITED STATES PATENTS

| | | | |
|---|---|---|---|
| 1,315,822 | 9/1919 | Doran | 277/74 |
| 1,876,515 | 9/1932 | Emmet | 277/74 |
| 2,841,244 | 7/1958 | Sorem | 184/1 E |
| 3,194,342 | 7/1965 | Heim | 184/1 E |
| 3,518,917 | 7/1970 | Sluham | 184/1 E |
| 3,534,553 | 10/1970 | Norton et al. | 184/1 E |
| 3,561,775 | 2/1971 | Sturlason | 277/93 SD |

FOREIGN PATENTS OR APPLICATIONS
45-27,946   11/1970   Japan .................................. 184/1 E Primary Examiner—Louis R. Prince
Assistant Examiner—Robert I. Smith
Attorney, Agent, or Firm—Carl B. Fox, Jr.

[57] ABSTRACT

Seals for rotary shafts wherein a surface-to-surface lapped seal is lubricated by injection of lubricant to between the lapped surfaces. Where formation of ice at the seal is likely to occur, the lubricant may be an oily material capable of preventing formation of ice crystals between the lapped sealing surfaces and of removing previously formed ice crystals from between the lapped sealing surfaces, rendering the invention particularly useful in connection with handling of materials such as ethylene and propylene in which ice formation occurs when moisture is present.

2 Claims, 3 Drawing Figures

3,837,659

SEALS FOR ROTARY SHAFTS

BACKGROUND AND SUMMARY OF THE INVENTION

Seals for the rotating shafts of pumps and other equipment are frequent sources of trouble. This is particularly true under adverse working conditions, such as where ice formation occurs between lapped sealing surfaces. Spring-loaded lapped seals of the dynamic type usually have lapped steel-to-graphite seal elements, or lapped metal-to-metal seal elements. The surfaces of the seal elements tend to wear and are subject to frequent replacement, particularly when a friction-increasing substance such as ice crystals is formed between the surfaces. Ice formation on lapped seal surfaces can bind the seals so that the equipment cannot be started or operated.

This invention provides lubricated lapped seals of the spring-loaded dynamic type. In the seals according to the invention, a non-rotating ring forms one seal element and a rotating ring having lapped surface-to-surface with the non-rotating ring forms the other seal element. Ports are provided for injection of lubricant to between the lapped surfaces. The lubricant may be used only for the purpose of lubrication to prevent wear between the lapped surfaces and to reduce friction and prevent drag at the seals, or the lubricant may be a substance capable of preventing ice buildup between the lapped surfaces or of removing ice already formed. The rotary shaft may, for example, be the shaft of a centrifugal pump.

Centrifugal pumps used for pumping such materials as ethylene ($CH_2 = CH_2$) and propylene ($CH_3 - CH = CH_2$), of the alkene series, for example, are notable for problems with the rotating shaft seals. Centrifugal pumps having lapped metal-to-carbon or metal-to-metal shaft seals are commonly used in this service. Ethylene or propylene containing any amount of water and which seeps to between the seal elements, especially when the pumps are shut down, results in formation of ice between the seal elements. Not only does this cause excessive wear on the seal elements because of excessive friction, but start up of a pump after it has been shut down may be rendered difficult or impossible because of freezing up of the seal elements by ice accumulation.

It has been found, under these ice-forming conditions, that use of an oil having a low freezing point and having a low contamination characteristic, such as UCON oil, as the seal lubricant, will completely eliminate ice formation between the seal element surfaces, and will remove ice already formed between the seal element surfaces. Any oil of sufficiently low freezing point, i.e., having a freezing point below the temperature at which the seal is to be operated, may be used. Besides UCON oil, which is a polyalkylene glycol compound, the oils known as CORAY NO. 37 and ZENICE may be used. These types of oils, in addition, serve as entirely satisfactory lubricants, and serve to reduce friction and wear of the seal elements whether or not ice formation is a problem. When used for lubricating the seals of pumps or other equipment handling materials such as ethylene and propylene, or other similar chemicals, these oils do not contaminate the material in any manner that will render it unfit for its intended use.

Replacement of seal rings of the type described has been largely eliminated through use of this invention. Under the described icing conditions, ordinary seals require seal ring replacement at very frequent intervals, as often as daily or even after only a few hours of operation. Through use of the invention, seal replacement has been extended to much less frequent intervals, of several months to a year, or even longer.

Other objects and advantages of the invention will appear from the following detailed description of a preferred embodiment of apparatus according to the invention, reference during the description being made to the accompanying drawings.

DESCRIPTION OF THE PREFERRED EMBODIMENT

Figure 1:
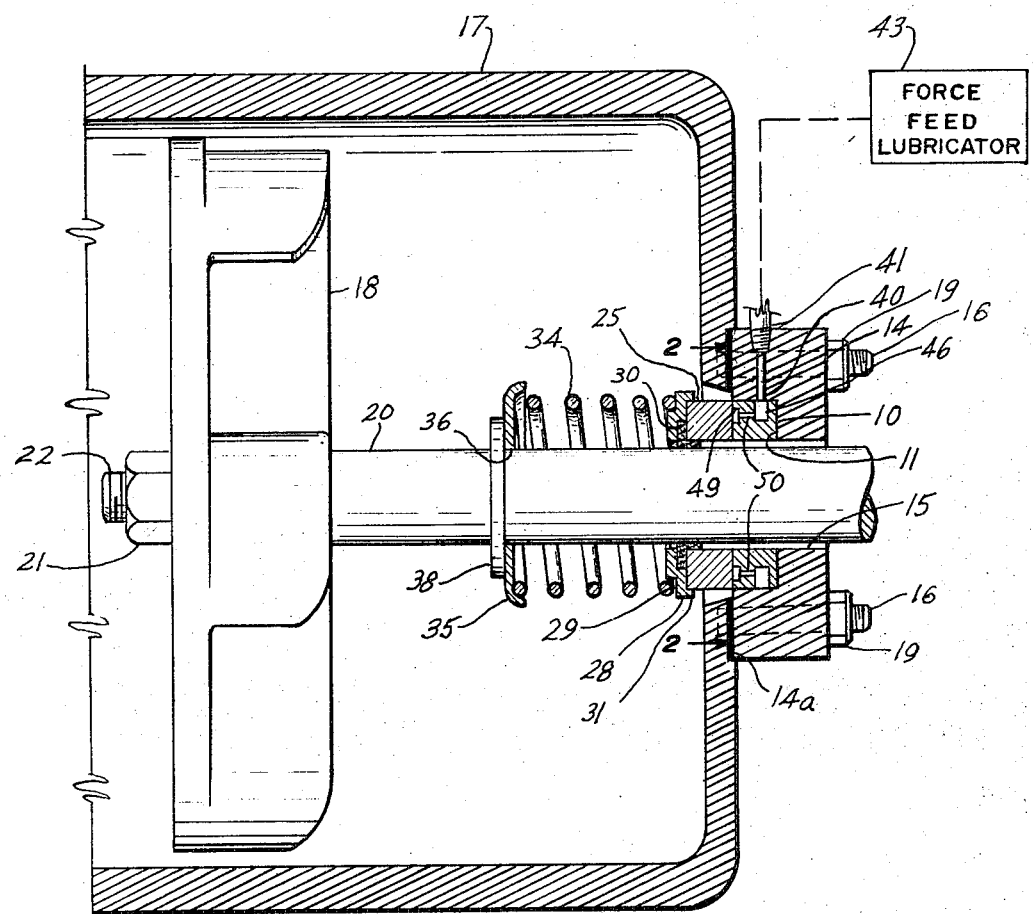
FIG. 1 is a vertical cross sectional view of a seal of preferred form according to the invention, the seal being shown as an element of a centrifugal pump which is shown schematically.
Figure 2:
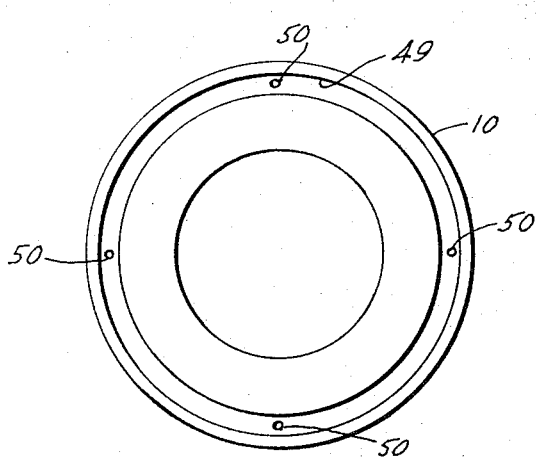
FIG. 2 is a transverse vertical cross sectional view of the seal shown in FIG. 1, taken at line 2—2 of FIG. 1.
Figure 3:
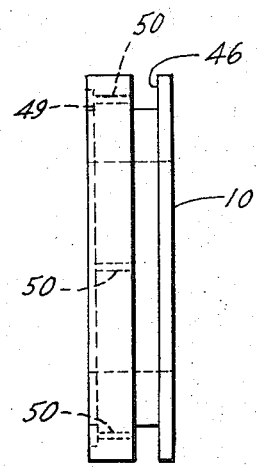
FIG. 3 is a side elevational view of the seal shown in FIG. 1.

Referring now to the drawings in detail, the preferred embodiment of apparatus shown therein includes a stationary ring 10 which is closely and sealingly press-fitted into an annular recess 11 around the inner side of gland formation 14 and around shaft opening 15 through gland formation 14. Gland 14 is secured to pump casing 17 by studs 16 and nuts 19, and sealed by gasket 14a.

The seal is shown in FIG. 1 to be an element of a centrifugal pump which is shown only schematically in FIG. 1. The pump casing 17 encloses a pump impeller 18 carried on shaft 20 and secured thereto by nut 21 screwed onto the threaded end 22 of shaft 20. Shaft 20 is coaxially disposed through the center of seal ring 10, and extends through shaft opening 15 to the exterior of the pump. A means for rotating shaft 20 to drive the pump is connected to the end of shaft 20 outside of the pump casing. Such driving means forms no part of the invention and is not shown in the drawings.

The showing of FIG. 1 is only for illustrating a use of the invention. The shaft 20 could be a rotating shaft of any type of mechanical equipment which must be sealed at its passage through a wall or wall-like member. When shaft 20 is rotated, impeller 18 is rotated to propel fluid to be pumped.

Seal ring 25 is shown to be and is preferably of the same or approximately the same dimensions as seal ring 10. Ring 25 is disposed in flush abutting relationship against the inner side of ring 10. The surfaces of rings 10, 25 which abut are lapped; that is, the surfaces are accurately ground to be flushly disposed together over their entire contact areas. The fit is such that a seal against fluid flow from the outer side of the ring abutment to the inner side is provided, although there is usually at least some fluid penetration between the seal rings.

Ring 25 is held centered about shaft 20 and in coaxial abutment with ring 10 by spring retainer ring 28. Ring 28 is of radially stepped form as shown to provide a spring seat shoulder 29 therearound. A packing ring 30 of L-shaped cross section is disposed in the inwardly facing annular slot formed between retainer ring 28 and ring 25, and extends along the shaft within ring 25 for a short distance. Packing ring 30 forms a stationary seal between shaft 20 and ring 25, which rotate together at the same rotational speed. A narrow flange 31 around the periphery of retainer 28 overlaps the edge of ring 25 to center ring 25. Helical compression spring 34 is disposed under compression between retainer ring 28 and dished spring retainer plate 35 which is circular and has a concentric circular opening 36 therethrough fairly closely fitted around shaft 20. A collar 38 of circular shape integral with shaft 20 holds spring retainer plate 35 against movement toward the left as shown in FIG. 1. Spring 34, therefore, presses seal ring 25 against seal ring 10. When shaft 20 is rotated, ring 25 rotates with the shaft while ring 10 remains stationary. The seal formed is often termed a dynamic seal since ring 25 is in motion relative to stationary ring 10.

A port 40 extends radially outwardly through formation 14 from recess 11. Port 40 is tapped at its outer end to receive a pipe nipple 41 which connects through suitable flow connections to the fluid lubricant outlet of force feed lubricator 43.

Ring 10 has an annular groove 46 therearound with which port 40 is in fluid flow communication. At its face toward ring 25, ring 10 has therearound an annular groove 49. Groove 49 is in fluid flow communication with groove 46 through plural ports 50. There must be at least one port 50, although any plurality of such ports may be employed. Four ports 50 are shown in the preferred embodiment shown in the drawings. Where plural ports 50 are employed, it is preferred that they be equally circularly spaced around ring 10.

Since the fluid pressure of the material being handled is exerted on the crack or abutment between rings 10 and 25 from the outside of the rings, the groove 49 should preferably be disposed fairly close to the outer periphery of the rings. Thus, any pressure seepage to between the rings will contact oil carried in the groove and oil moved by the fluid pressure will be spread over the abutting ring surfaces.

Groove 49 may be disposed in either ring 10 or ring 25, and may be replaced by any suitable oil flowway means, such as by closely spaced ports 50 of greater plurality, or other suitable arrangement.

Force feed lubricator 43, of any suitable type, delivers liquid lubricant through nipple 41 and port 40 into groove 46, from which the lubricant flows through port or ports 50 to groove 49. From groove 49 the lubricant spreads over the contact area between rings 10 and 25. Since these contact surfaces are lapped and closely fitted, only a very small amount of lubricant is required to be delivered thereto in order to provide adequate lubrication. Normally, only a few drops of lubricant per hour will be consumed. The lubricant reduces friction between rings 10 and 25 so that wearing out of the abutting ring surfaces will not occur rapidly.

In most seals of the type shown the ring in the position of ring 10 is made of carbon, while the ring in the position of ring 25 is made of steel. The steel ring usually will require frequent replacement because of wear caused by relative rotations between the rings. With the invention as herein disclosed, both rings 10 and 25 are preferably made of steel or other metal. Lubrication of the rings in the described manner reduces wear to the point where the rings must only infrequently be replaced, or never replaced.

The invention is particularly useful when the centrifugal pump or other apparatus wherein a seal about a rotating shaft is required is used for handling materials such as ethylene and propylene. Such liquids are at very cold temperatures, and since they nearly always contain at least traces of water, ice tends to form between the engaged seal rings 10, 25, particularly when the pump is shut down. A small amount of seepage from the pump chamber to between the rings 10, 25 usually occurs, and ice crystals build up between the rings. The presence of ice crystals between the rings may cause freezing-up so that ring 25 will not rotate. This may prevent start-up of the pump or other equipment after it has been shut down. During operation, a small amount of seepage as described occurs so that ice continually forms between the sealing rings and causes increasing of friction and excessive wear of the rings. In such a situation, the lubricant fed by lubricator 43 may be composed of an oil having a low freezing temperature, lower than the temperature of the material sealed off by the seal, such as the polyalkylene glycol known as UCON oil. Other materials besides UCON oil having the same properties may be employed, such as CORAY NO. 37 or ZENICE. These oils have the property of liquefying ice with which they come into contact. Therefore, the small amount of oil between rings 10, 25 eliminates formation of ice crystals between the rings. If ice is already present between the rings, injection or force feeding of the oil in the described manner will immediately cause liquefying of the ice whereby increased friction between the rings resulting therefrom is completely eliminated. When the pump or other equipment has been shut down, and a relatively great amount of ice has been formed between the rings, force feeding of such a lubricant to between the seal rings will remove the ice and permit immediate start-up of the pump or other equipment. In this way, excessive wear of rings 10, 25 is eliminated, whereby both rings may be made of steel and yet still have extremely long wear life and utility.

It will be realized that the grooves 46 and 49, and the ports 40, 50 leading thereto and therebetween may be of any desired form. So long as the lubricant is moved to the engaged seal ring faces, the intent of the invention will be accomplished. Where ice formation is not a problem, any liquid or flowable paste lubricant may be employed in the described manner.

As has been stated, the schematic representation of a pump shown in FIG. 1 is not intended to limit the invention. The seal may be used in any apparatus or system to provide a seal for a rotary shaft passing through a wall or into an opening. The pump representation in FIG. 1 does not indicate any particular kind or form of centrifugal pump, and only indicates a housing and an impeller in a generalized representational manner.

While a preferred embodiment of the invention has been shown in the drawings and described, many modifications thereof may be made by persons skilled in the art without departing from the spirit of the invention, and it is intended to protect by Letters Patent all forms of the invention falling within the scope of the following claims.

I claim:

1. Dynamic shaft seal for use in handling one or more chemicals selected from the group consisting of ethylene and propylene, comprising first and second seal elements flushly engaged one against the other and disposed about a shaft, said first seal element being fixed about an opening of a structure through which said shaft is disposed for rotation, said second seal element being supported about the shaft for rotation therewith, means for biasing said second seal element toward said first seal element, port means through at least one of said first and second seal elements leading to the interface therebetween, and means for introducing lubricant comprising a polyalkylene glycol which prevents ice formation between said seal elements and which acts to eliminate ice already formed between said seal elements through said port means to said interface to lubricate between said first and second seal elements whereby said seal is protected when used under icing conditions.

2. The combination of claim 1, said first seal element being a metal ring fixed in an annular recess of said structure surrounding said shaft, said second seal element being a metal ring disposed around said shaft, seal means between said second seal element and the shaft, said biasing means comprising a spring support carried by said shaft and compression spring means acting between said spring support means and said second seal element to bias said second seal element against said first seal element, said port means being disposed through said structure and through said first seal element and including annular groove means around the face of said first seal element against which said second seal element is engaged.

* * * * *